US012597532B2

(12) United States Patent
Niederberger et al.

(10) Patent No.: US 12,597,532 B2
(45) Date of Patent: Apr. 7, 2026

(54) METAL-INSIDE-FIBER-COMPOSITE AND METHOD FOR PRODUCING A METAL-AND-FIBER-COMPOSITE

(71) Applicant: qCella AG, Zürich (CH)

(72) Inventors: Markus Niederberger, Wolfenschiessen (CH); Murielle Schreck, Züroch (CH)

(73) Assignee: qCella AG, Zürich (CH)

( * ) Notice: Subject to any disclaimer, the term of this patent is extended or adjusted under 35 U.S.C. 154(b) by 212 days.

(21) Appl. No.: 18/555,045

(22) PCT Filed: Mar. 10, 2022

(86) PCT No.: PCT/EP2022/056241
§ 371 (c)(1),
(2) Date: Oct. 12, 2023

(87) PCT Pub. No.: WO2022/218621
PCT Pub. Date: Oct. 20, 2022

(65) Prior Publication Data

US 2024/0194370 A1 Jun. 13, 2024

(30) Foreign Application Priority Data

Apr. 16, 2021 (EP) .................................... 21168929

(51) Int. Cl.
*H01B 1/22* (2006.01)
*D06M 11/83* (2006.01)
*D06M 101/06* (2006.01)

(52) U.S. Cl.
CPC ............... *H01B 1/22* (2013.01); *D06M 11/83* (2013.01); *D06M 2101/06* (2013.01); *D06M 2200/00* (2013.01); *D06M 2200/35* (2013.01)

(58) Field of Classification Search
CPC ..... H01B 1/22; D06M 11/83; D06M 2101/06; D06M 2200/00; D06M 2200/35; D06M 2101/12
USPC .... 428/36.3, 293.1, 364, 373, 375, 376, 398
See application file for complete search history.

(56) References Cited

U.S. PATENT DOCUMENTS

2006/0068667 A1 3/2006 Zabetakis et al.

FOREIGN PATENT DOCUMENTS

CN 111168081 5/2020
WO 2009129410 10/2009
WO 2016126212 8/2016

*Primary Examiner* — Matthew D Matzek
(74) *Attorney, Agent, or Firm* — Volpe Koenig

(57) ABSTRACT

A metal-inside-fiber-composite including a biopolymer based fiber having a fiber wall and a void space. The fiber wall envelops the void space such that the void space forms a continuous void space inside and along the fiber. A metal microstructure makes the metal-inside-fiber-composite electrically conductive. A method for producing a metal-and-fiber-omposite, in particular a metal-inside-fiber composite, is also provided.

8 Claims, 5 Drawing Sheets

METAL-INSIDE-FIBER-COMPOSITE AND METHOD FOR PRODUCING A METAL-AND-FIBER-COMPOSITE

CROSS-REFERENCE TO RELATED APPLICATIONS

This application is a 371 National Phase of PCT/EP2022/056241, filed Mar. 10, 2022, which claims priority from European Patent Application No. 21168929.4, filed Apr. 16, 2021. Both of which are incorporated herein by reference as if fully set forth.

TECHNICAL FIELD

The invention relates to the field of fiber based functional composites and methods for producing the same. More specifically the invention relates to a metal-inside-fiber-composite, wherein the fiber is a biopolymer based fiber including a metal microstructure inside the fiber and to a method for producing a metal-and-fiber-composite, wherein the method can be used for producing the metal-inside-fiber composite.

BACKGROUND

Many biopolymers and especially cellulose are abundant, renewable, biodegradable and natural polymers. Cellulose is obtained after the delignification of wood and demonstrates bio- and environmental compatibility. These characteristics make cellulose an exceptionally valuable material especially in view of concerns about environmental pollution from toxic and non-biodegradable materials and a commitment to sustainability.

In the following, different fields, each including its specific problems to be solved, are outlined in examples one to six. For all the examples, a fiber based functional composite, wherein the fiber is a biopolymer based fiber, can contribute to solving each of the specific problems.

As a first example: The replacement of plastic materials by cellulose as substrates in flexible electronic devices offers great potential to lower the environmental impact. Driven by the high interest in wearable electronics and implantable medical devices it can be expected that the need for flexible sensors, actuators, batteries, displays, etc. will increase significantly in the years to come. As the typical lifetime of these devices will be shorter than that of their rigid counterparts, alternative materials to non-degradable, fossil-fuel-based, or difficult to recycle polymers like polyethylene terephthalate, polyethersulfone, polyethylene naphthalate and polyimide will be essential to lower the strain of the electronic waste on our environment. Cellulose is the perfect alternative material for the production of substrates for flexible electronics. Additionally to its environmental friendliness, cellulose is also promising because of its low cost and light weight. In fact, it has already attracted a lot of attention in other areas of electronics.

As a second example: It is a fact that millions of people in the world carry implantable medical devices that rely on onboard electronics, examples are neurostimulators, cochlear implants, bowel and bladder control stimulation implants, cerebral spinal fluid shunt systems, visual prostheses, implantable drug infusion pumps and, of course, pacemakers and cardioverter defibrillators. All these devices can be affected by electromagnetic radiation (EMR) being emitted from any kind of external electrical device, and malfunctioning devices can lead to discomfort or even death. Electromagnetic interference (EMI) shielding and filtering is of great importance and it protects the implantable medical device and, therefore, the host patient.

As a third example: Electromagnetic hypersensitivity (EMH) is a controversial topic. People who claim that they suffer from EMH report sleep disorders, asthenia, headaches, memory and concentration difficulties, dizziness, musculoskeletal pain, skin conditions and mood disorders.

As a fourth example: Data security is nowadays very important. Mobile phones, laptops, credit cards, keyless locking systems for cars or data cables, all are vulnerable to data theft.

As a fifth example: Heated clothing products on the market contain heating wires, which are connected to a battery. These products are often quite rigid and bulky and the embedded heating wires only heat up parts of the clothing.

As a sixth example: Thin electronic cables, for example included in headphone cables, are prone to break upon excessive use.

What is needed for solving the above indicated problems are electrically conductive fabrics, in particular fiber based fabrics, wherein the fiber is a biopolymer based fiber.

Furthermore, simple, fast and up-scalable methods for producing such electrically conductive fabrics are needed.

Despite all its benefits, biopolymers for example cellulose, or cellulose based fibers, lack the one functional property, which is crucial for solving the above indicated problems related to, for example, flexible electronics, electromagnetic shielding, resistive heating etc., namely electrical conductivity.

Known methods for making biopolymers, for example cellulose, electrically conductive relate to combining them with electrically conductive materials like conductive polymers, carbon nanotubes, graphene oxide, conductive oxides, inorganic nanoparticles, or metals. To achieve high electrical conductivity, metal and especially copper, being a low-cost and highly conductive material is the material of choice. Copper is biocompatible and antimicrobial and, additionally, with respect to sustainability, copper is attractive because of its abundance.

Besides copper and depending on the specific application also other metals can be of interest, for example gold, silver, palladium, platinum and lead.

Different techniques have been proposed for rendering biopolymer based fibers electrically conductive, for example by using surface modification processes like atomic layer deposition, electrodeposition, magnetron sputtering, and electroless plating. For example, WO2016126212 discloses a method for plating a metal on a textile fiber. Another example related to particle coatings on fibrous material is disclosed in WO2009129410. US20060068667 discloses metallized fibers and a fabrication method for producing the same.

Among these techniques, atomic layer deposition is rather used for the functionalization of surfaces or for the creation of nucleation layers whereas electro-deposition already requires an electrically conductive substrate from the start.

Magnetron sputtering and electroless plating of copper onto cellulose fibers or papers has drawn a lot of attention recently.

For example, magnetron sputtering can be used to deposit copper on the fiber framework of a cellulose paper. This simple and fast method is used to produce flexible and freestanding electrodes.

As a physical vapor deposition technique, magnetron sputtering provides homogeneous films. However, it is not the ideal technique to coat high aspect ratio, porous or 3D structures. Additionally, the necessity to work under vacuum increases the costs. A cheaper and widely investigated alternative is electroless plating.

For example, aqueous electroless copper plating of the cellulose fibers in paper can be used to produce lightweight, flexible and foldable current collectors for battery applications. It typically includes a multistep synthesis requiring a reduction and sintering step to obtain a metal copper coating.

Another approach relates to depositing silver seeds onto a cellulose fabric, which activates the surface. The silver seeds serve as catalysts for the subsequent electroless copper deposition.

Although, electroless plating itself is a simple process, the examples briefly outlined above show that the coating of biopolymer based fibers or cellulose papers with copper still requires catalysts or additional pre- or post-treatments of the pristine or the copper-coated cellulose fibers, respectively. The electrical conductivity exists only on the surface of the fibers and if the copper does not adhere well to the biopolymer or the coating is incomplete or cracked, the electrical conductivity can be completely inhibited.

What is needed is a biopolymer based electrically conductive material, in particular in the form of a starting material, which enables the fabrication/production of an electrically conductive fabric therefrom.

Thereby, the biopolymer based electrically conductive material should not suffer from problems relating to a delamination and/or breakage of a metal coating upon mechanical deformation.

What is further needed is a simple, fast and up-scalable method for producing electrically conductive fabrics and such biopolymer based electrically conductive material.

SUMMARY

It is an object of the invention to provide a biopolymer based electrically conductive material, which does not suffer from disadvantages mentioned above.

It is a further object of the invention to provide a method for producing electrically conductive fabrics and the biopolymer based electrically conductive material.

The invention relates to a metal-inside-fiber-composite including a biopolymer based fiber (2) having a fiber wall and a void space, wherein the fiber wall envelops the void space such that the void space is formed as a continuous void space inside and along the fiber, and a metal microstructure. The metal microstructure is a microstructure of an elemental metal, fills and extends through and along the continuous void space such that the fiber wall forms a protective layer around the metal microstructure, includes metal particles being crystalline, having an average particle size of at least 80 nm, and being interconnected to form the metal microstructure, is included in the metal-inside-fiber-composite by at least 60 weight percent of the total weight of the metal-inside-fiber-composite and—based thereon—makes the metal-inside-fiber-composite electrically conductive.

Thereby, a metal-inside-fiber-composite relates to a composite including a non-metallic fiber having a metal structure inside the fiber.

The fiber wall can be microporous. In particular, the fiber wall has pores with an average pore size lying within the range of approximately 5 to 30 nm.

The void space can include biopolymer based strut-like elements extending through the continuous void space without closing off a first portion of the continuous void space from a second portion of the continuous void space.

The biopolymer based fiber extends along a fiber direction, wherein the void space forms a continuous void space inside the fiber and along the fiber direction.

Examples of biopolymer based fibers are cellulose based fibers, cotton fibers, silk etc.

The biopolymer based fiber by itself is electrically not conductive.

The metal microstructure is a microstructure of an elemental metal, in particular wherein the metal microstructure does not include a further metal phase resulting from using a metal catalyst based production method, such as for example silver, palladium, platinum etc. Thereby, the metal microstructure, according to the invention, does not include foreign metal phases, which could negatively influence physical properties of the metal microstructure such as for example the electrical and/or thermal conductivity, the thermal/chemical stability etc.

The metal microstructure is enveloped by the fiber wall such that the fiber wall forms a protective layer around the metal microstructure. The protective layer can relate to a layer protecting the metal microstructure from environmental corrosion/oxidation. Corrosion/oxidation of the metal microstructure typically results in a deterioration of at least some of its physical properties, such as for example the electrical and/or thermal conductivity, the thermal/chemical stability etc. Thereby, the metal microstructure's resistance against environmental influences is increased.

The protective layer can relate to a layer protecting the metal microstructure from abrasion. Thereby, the protective layer protects the metal microstructure from mechanical loads such that the metal microstructure, being exposed to mechanical loads, shows improved resistance against abrasion effects. This can be especially advantageous when the metal-inside-fiber-composite is further processed to produce, for example, a fabric/textile therefrom. During related further processing the metal-inside-fiber-composite is typically subjected to mechanical loads.

The metal particles, being grown inside the void space to an average particle size of at least 80 nm, are effectively retained inside the fiber by the fiber wall, which can be microporous, in particular and have pores with an average pore size lying within the range of approximately 5 to 30 nm.

The metal particles can be interconnected by touching each other and/or sticking together. The interconnection can be such that the metal microstructure forms a self-supporting metal microstructure inside the fiber. Besides being interconnected, the metal particles can also be connected to an inner surface of the fiber. The size of the metal particles in combination with the metal particles being interconnected make the metal microstructure electrically conductive.

The metal-inside-fiber-composite includes the metal microstructure by at least 60 weight percent of the total weight of the metal-inside-fiber-composite. Such a high metal loading directly impacts at least some of the physical properties of the metal microstructure, for example such as the electrical/thermal conductivity.

According to an embodiment of the invention, the biopolymer based fiber is a cellulose based fiber having the fiber wall and a fiber lumen, wherein the fiber wall envelops the fiber lumen such that the fiber lumen forms the continuous void space inside and along the fiber.

The fiber lumen can include cellulose based strut-like elements extending through the continuous void space without closing off a first portion of the fiber lumen from a second portion of the fiber lumen.

The cellulose based fiber extends along a fiber direction, wherein the fiber lumen forms a continuous void space inside the fiber and along the fiber direction.

According to an embodiment of the invention, the elemental metal is one of copper, nickel, gold, silver, palladium, platinum and lead.

Copper is a low-cost, highly conductive material. Furthermore, it has advantageous antimicrobial characteristics and exhibits a high degree of biocompatibility.

Therefore, producing electrically conductive composites of biopolymer and copper is very attractive regarding conductivity, compatibility and costs.

According to an advantageous embodiment of the invention, the metal-inside-fiber-composite includes the metal microstructure by at least 70 weight percent, by at least 80 weight percent, by at least 90 weight percent, or by at least 95 weight percent of the total weight of the metal-inside-fiber-composite.

According to a further advantageous embodiment of the invention, the metal microstructure fills the void space to such a degree that the fiber wall is tight to the metal microstructure, the fiber wall is supported by the metal microstructure, and the fiber is bulging compared to the fiber being in a state where the void space is empty.

The fiber wall being tight to the metal microstructure relating to the fiber wall being tightly fitting to the metal microstructure. Thereby, the fiber wall can touch the outer portion of the metal microstructure to a large extent.

The metal microstructure can support the fiber wall by supporting an inner surface of the fiber wall.

Supporting can relate to stabilize the fiber wall against collapsing.

The support can be effected by filling the void space with as much of the metal microstructure that points of an inner surface of the fiber wall are connected to diametral opposite points of the inner surface via portions of the metal microstructure extending through the void space, in particular through the lumen, and roughly along the diametral direction.

The fiber bulges if the impression is created, that the fiber is filled to the brim. This can be evaluated for example by comparing a biopolymer based fiber, in particular a cellulose based fiber, with an empty void space and/or lumen to one having the void space and/or lumen filled with the metal microstructure. The biopolymer based fiber, in particular the cellulose based fiber, having an empty void space and/or lumen typically shows collapsed fiber walls, wherein a bulging fiber has fiber walls being supported by the metal microstructure from the inside such that the fiber wall is bulged at least to a large extent.

A biopolymer based fiber filled with the metal microstructure to such a degree exhibits improved functional properties, relating to, for example, electrical/thermal conductivity or structural stability of the metal microstructure.

According to a further embodiment of the invention, the metal particles have an average particle size between 80 nm and 1000 nm, in particular of at least 100 nm, 150 nm, 200 nm or 400 nm, or, of at most 1000 nm, 800 nm or 600 nm.

According to a further embodiment of the invention, the fiber is a plant derived natural cellulosic fiber.

According to a further embodiment of the invention, the protective layer protects the metal microstructure from environmental corrosion and/or abrasion.

The invention further relates to a fabric, wherein the fabric includes a metal-inside-fiber-composite, according to the invention and as outlined above.

The fabric can be, for example, a yarn, which is produced using a metal-inside-fiber-composite according to the invention. Furthermore, the fabric can be, for example, a fabric made from yarn.

The invention further relates to a method for producing a metal-and-fiber-composite. The method includes the steps of providing a fibrous material, in particular a fiber, providing a first reactant mixture including a metal salt dissolved in a first alcohol, combining the first reactant mixture with the fibrous material, heating the first reactant mixture being combined with the fibrous material to at least 140° C., in particular to at least 160° C., with the first reactant mixture being combined with the fibrous material at the at least 140° C., in particular at the at least 160° C., adding a second reactant mixture to the first reactant mixture being combined with the fibrous material, reacting the reactant mixtures at the at least 140° ° C., in particular at the at least 160° C., to metallize the fibrous material. Thereby, the second reactant mixture includes the metal salt dissolved in the first alcohol, and adding the second reactant mixture to the first reactant mixture being combined with the fibrous material is repeated at least once.

Thereby, a metal-and-fiber-composite relates to a composite including a non-metallic fiber being combined with a metal structure. Combining can relate to, for example, coating or impregnating/penetrating the non-metallic fiber with the metal structure.

A fibrous material can be for example a fiber, a fabric made of fibers, wherein the fiber and/or the fabric is non-metallic. The fibers of which the fabric can be made can be biopolymer, in particular cellulose, based fibers. The fabric can be or include yarn.

Combining the first reactant mixture with the fibrous material can relate to adding the first reactant mixture to the fibrous material or vice versa adding the fibrous material to the first reactant mixture.

Heating to at least 140° C., in particular to at least 160° C., can be performed, for example, by using an oil bath or by using microwave irradiation.

The second reactant mixture can be a part taken from the first reactant mixture, for example, when the first reactant mixture is in the form of a stock solution.

Metallize relates to forming a metal microstructure making the metal-and-fiber-composite electrically conductive.

Adding the second reactant mixture to the first reactant mixture being combined with the fibrous material can be repeated, for example, at least twice, at least three times, at least four times, at least six times etc.

According to an embodiment of the invention, the metal salt is one of copper metal salt, nickel metal salt, gold metal salt, silver metal salt, palladium metal salt, platinum metal salt and lead metal salt, in particular one of copperacetylacetonate, copperacetate, coppermethoxide, nickelacetylacetonate, nickelacetate, and nickelmethoxide.

According to an advantageous embodiment of the invention, the first alcohol is benzyl alcohol or a derivative therefrom. A derivative of benzyl alcohol can be, for example, methyl benzyl alcohol, methoxy benzyl alcohol etc.

According to a further advantageous embodiment of the invention, the first and/or second reactant mixture includes a second alcohol, in particular one of methanol, ethanol and propanol.

According to a further advantageous embodiment of the invention, the method includes with the first reactant mixture being combined with the fibrous material at the at least 140° C., in particular at the at least 160° C., adding a third alcohol, in particular glycerol, to the first reactant mixture being combined with the fibrous material, in particular at a volume ratio of the volume of the first alcohol to the volume of the third alcohol of 3 to 1.

Instead of glycerol, alternatively, another polyol can be used, for example one of ethylene glycol, diethylene glycol, triethylene glycol etc.

According to a further advantageous embodiment of the invention, the first reactant mixture has the metal salt dissolved in the first alcohol at a concentration within the range of 0.2 to 0.5 moles per liter, in particular 0.22 or 0.44 moles per liter.

According to a further advantageous embodiment of the invention, the method includes, the fibrous material being a biopolymer based fiber having a fiber wall (3) and a void space (4), wherein the fiber wall envelops the void space such that the void space is formed as a continuous void space inside and along the fiber, and reacting the reactant mixtures at the at least 140° C., in particular at the at least 160° C., to form a metal-inside-fiber-composite, according to the invention and as outlined above.

The invention can further relate to a metal-inside-fiber-composite being produced according to the method of the invention.

BRIEF DESCRIPTION OF THE DRAWINGS

The inventive metal-inside-fiber-composite and the inventive method for producing a metal-and-fiber-composite are described below in more detail purely by way of example with the aid of concrete exemplary embodiments illustrated in the figures. Further advantages of the invention are also being examined. In detail, it is shown by.

DETAILED DESCRIPTION

Figure 1:
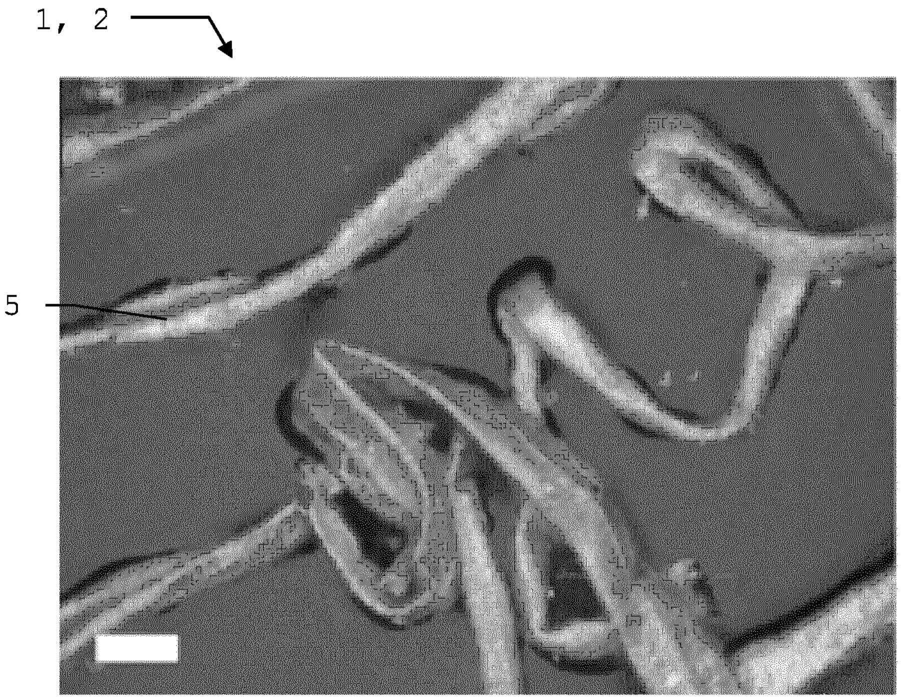
FIG. 1 An optical microscopy image of a metal-inside-fiber-composite according to an embodiment of the invention, scale bar 50 micrometers.
Figure 2:
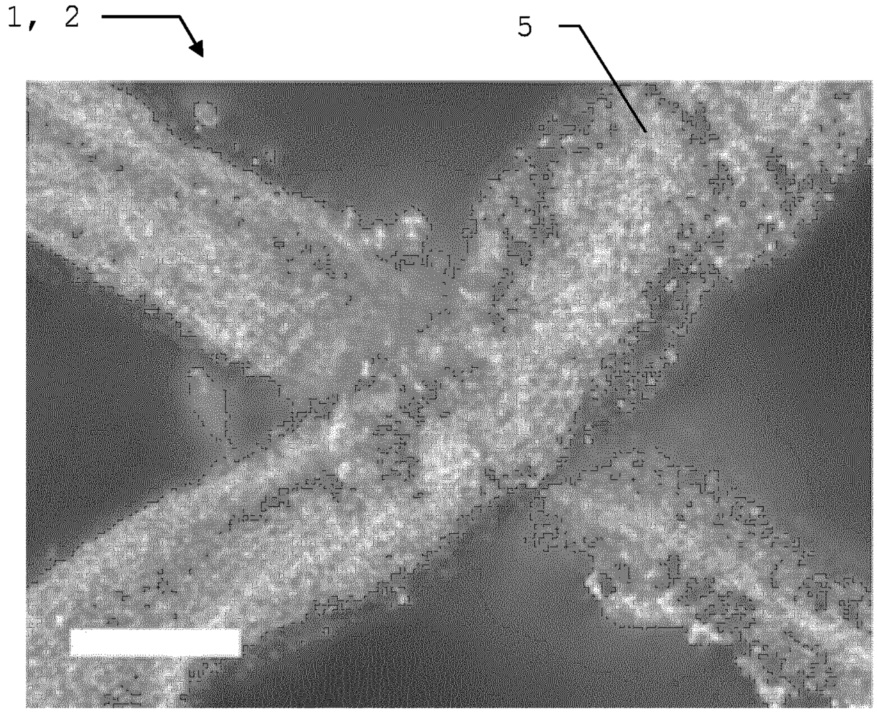
FIG. 2 An optical microscopy image of a metal-inside-fiber-composite according to an embodiment of the invention, scale bar 20 micrometers.
Figure 3:
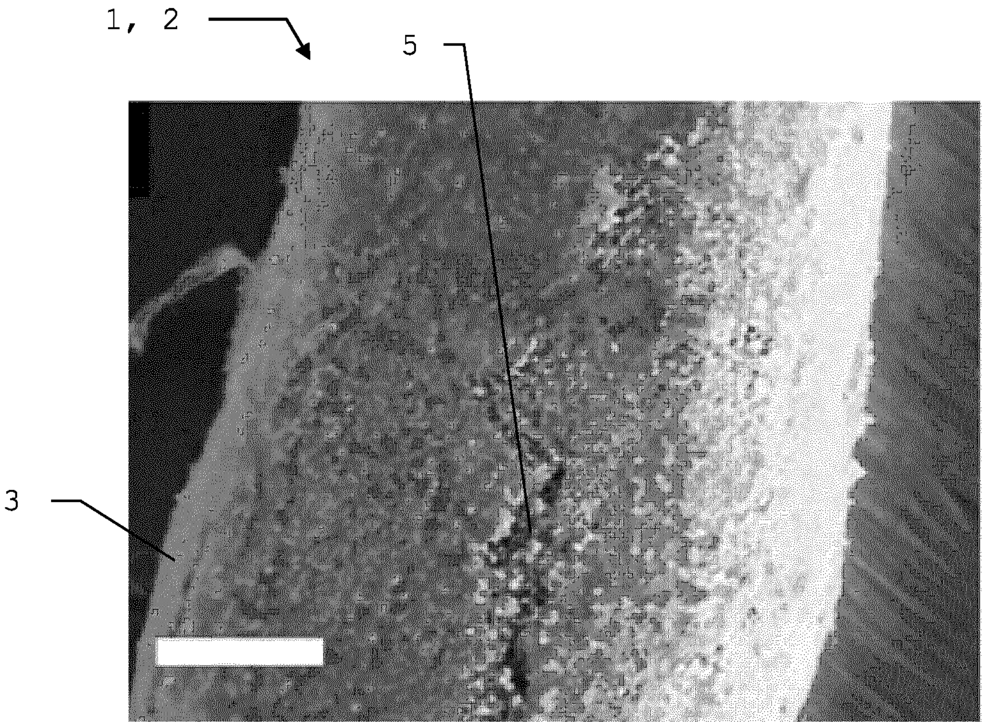
FIG. 3 An electron microscopy image of a metal-inside-fiber-composite according to an embodiment of the invention revealing a view to a fiber, which has a fiber wall being tight to the metal microstructure, has a supported fiber wall and is bulging, scale bar 10 micrometers.
Figure 4:
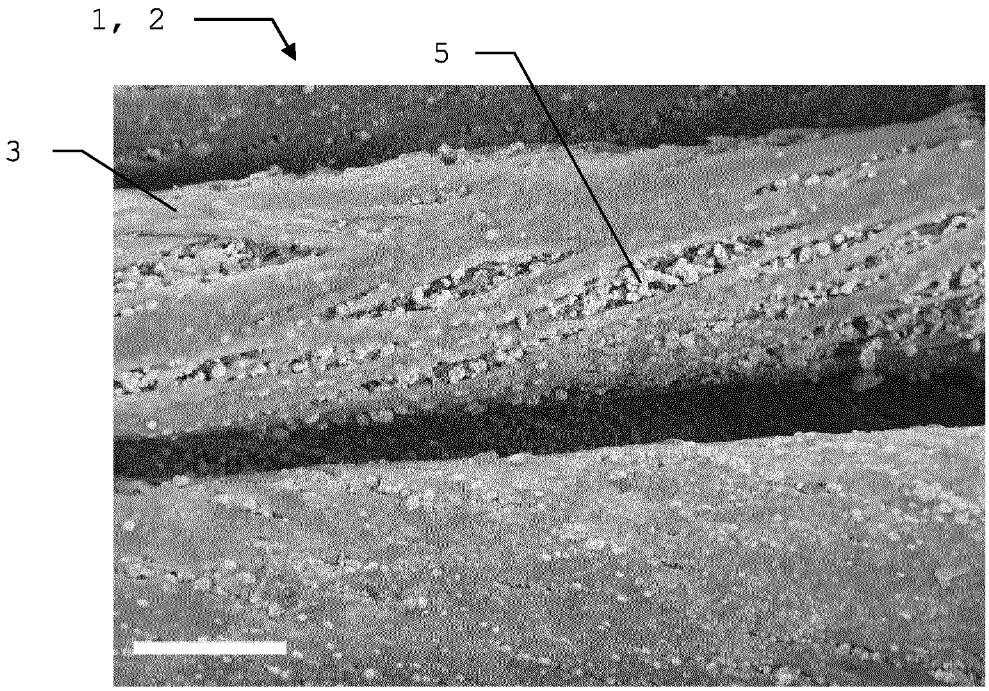
FIG. 4 An electron microscopy image of a metal-inside-fiber-composite according to an embodiment of the invention revealing a view to a fiber, which has a fiber wall being tight to the metal microstructure, has a supported fiber wall and is bulging, scale bar 10 micrometers.
Figure 5:
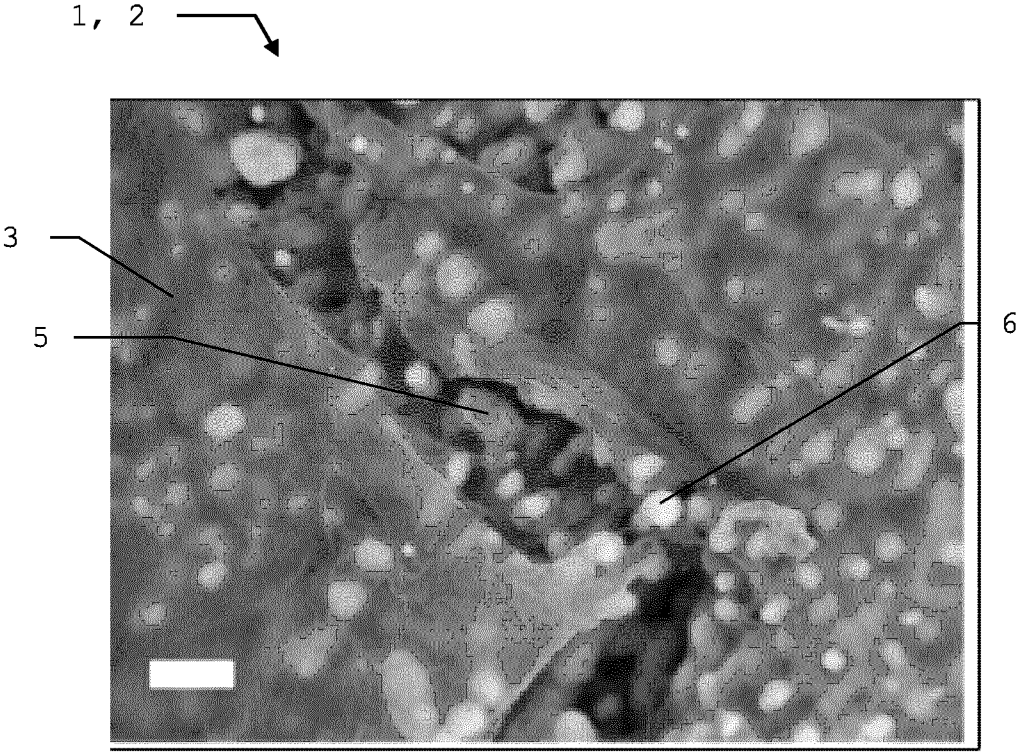
FIG. 5 An electron microscopy image of a metal-inside-fiber-composite according to an embodiment of the invention revealing a view to a fiber, which has a fiber wall being tight to the metal microstructure, has a supported fiber wall and is bulging, scale bar 1 micrometer.
Figure 6:
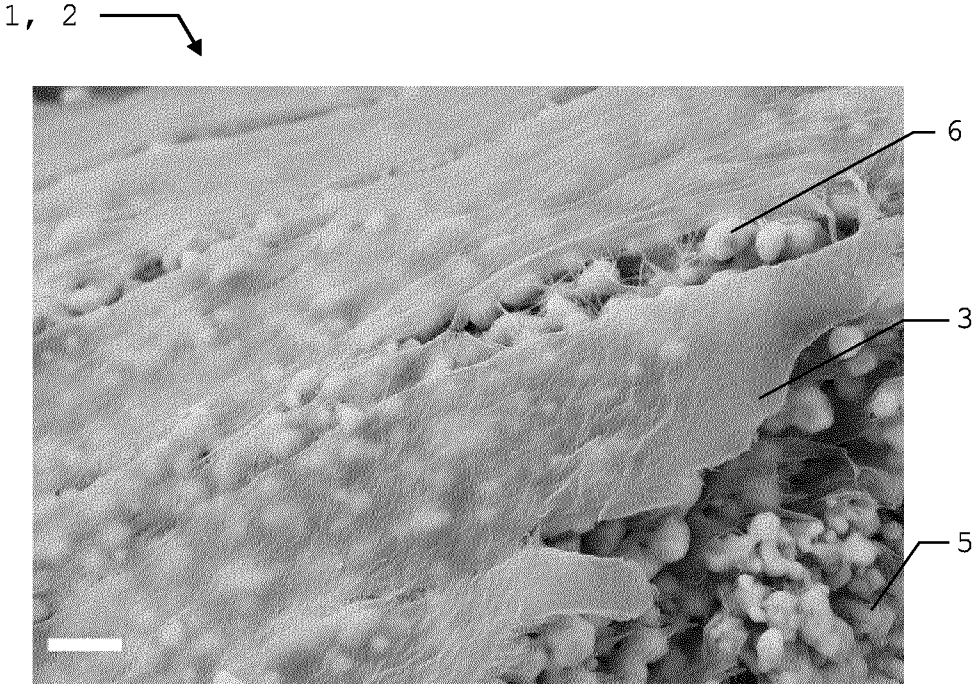
FIG. 6 An electron microscopy image of a metal-inside-fiber-composite according to an embodiment of the invention revealing a view to a fiber, which has a fiber wall being tight to the metal microstructure, has a supported fiber wall and is bulging, scale bar 1 micrometer.

FIGS. 1 and 2 show optical microscopy images of a metal-inside-fiber-composite 1 according to the invention. The elemental metal is copper. The fibers are cellulose based fibers 2. The metal-inside-fiber-composite is synthesized/produced by a method according to the invention. The optical microscopy images demonstrate how bright and shiny the metal-inside-fiber-composite is due to the metal microstructure 5.

FIGS. 3 to 7 show the metal particles 6 being interconnected to form the metal microstructure 5 inside the cellulose based fibers 2. FIGS. 3 to 7 further show the metal microstructure 5 filling and extending through and along the continuous void space of the fiber such that the fiber wall 3 forms a protective layer around the metal microstructure 5.

Figure 7:
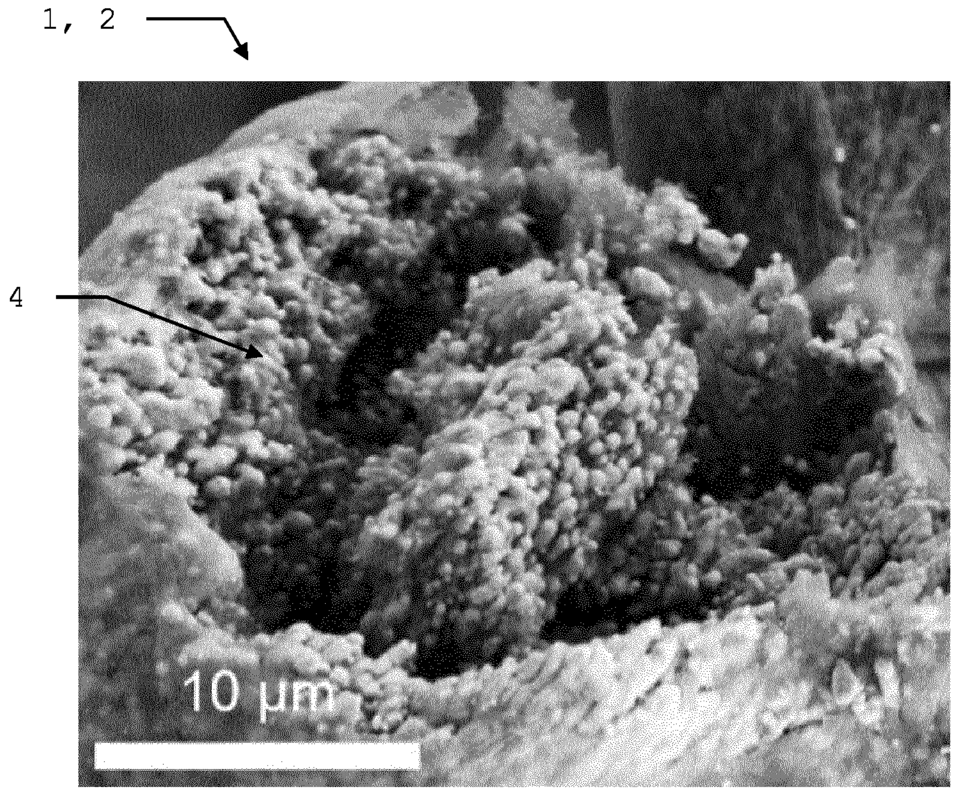
FIG. 7 An electron microscopy image of a metal-inside-fiber-composite according to an embodiment of the invention, revealing a view to a cross-section of the fiber as a result of fiber-fracture, scale bar 10 micrometers.

FIG. 7 shows a fractured metal-inside-fiber-composite 1 revealing a view to a cross-section of the cellulose based fiber 2 and to the continuous void space 4/fiber lumen being filled with metal particles 6.

The average particle size of the metal particles 6 of a metal microstructure 5 can be derived from electron microscopy images, based on measuring a reasonable number of metal particles 6 by determining their expansion into several directions in the image plane. The as derived metal particles' sizes are averaged by the number of measured metal particles 6. A reasonable number of metal particles 6 is, for example 20, 50 or 100. The as derived average particle size for metal-inside-fiber-composites 1 lies within the range of 80 nm to 1000 nm.

Metal-inside-fiber-composites 1 have been produced including the metal microstructure 5 by 60, 70, 80, 90, 95 or 98 weight percent of the total weight of the metal-inside-fiber-composite.

FIGS. 3 to 7, show a metal-inside-fiber-composite 1, wherein the metal microstructure 5 fills the void space to such a degree that the fiber wall 3 is tightly fitting to the metal microstructure 5.

FIGS. 3 to 7 further show, the fiber wall 3 being supported by the metal microstructure 5 such that the fiber wall does not collapse.

FIGS. 3 to 7 further show, that the fiber is bulging compared to the fiber being in a state where the void space is empty.

Figure 8:
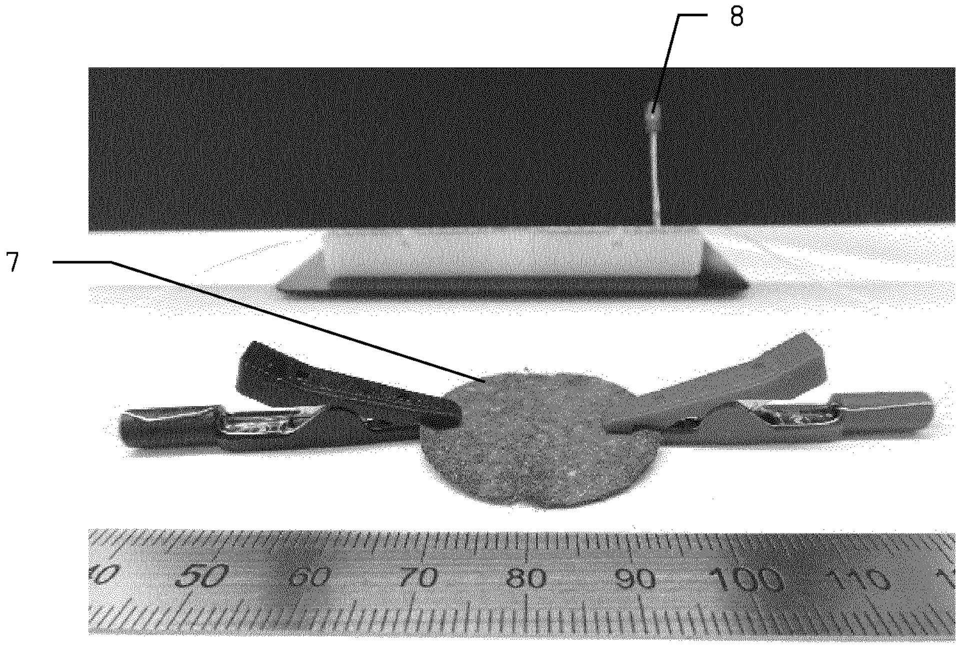
FIG. 8A fabric including a metal-inside-fiber-composite according to an embodiment of the invention.

Metal-inside-fiber-composites 1 according to the invention form a versatile starting material for producing fabrics 7 thereof. FIG. 8 shows such a fabric 7 being electrically conductive. The fabric 7 is a paper like structure including and produced from metal-inside-fiber-composites 1 according to the invention. FIG. 8 shows two crocodile clips connect the paper like structure 7 with a 3 V coin cell and a red lighting light emitting diode (LED) 8 (2.5 V, 25 mA, 100Ω) on a breadboard.

Figure 9:
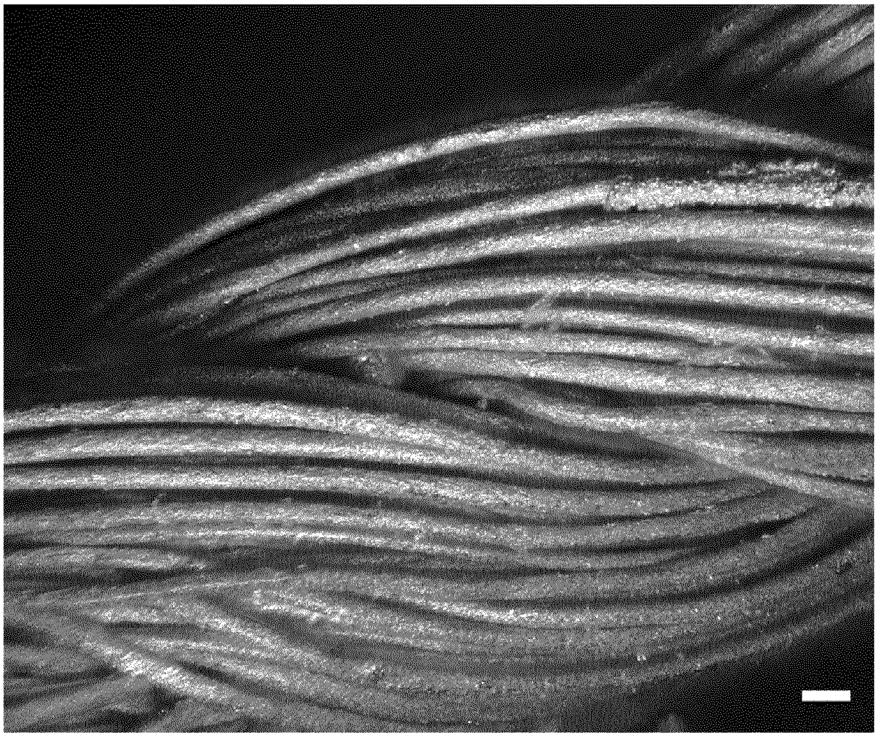
FIG. 9 An optical microscopy image of a fabric, the fabric being yarn, scale bar 20 micrometers.

FIG. 9 shows an optical microscopy image of a fibrous material, the fibrous material being yarn, wherein the fibrous material has been made electrically conductive by a method according to the invention.

Figure 10:
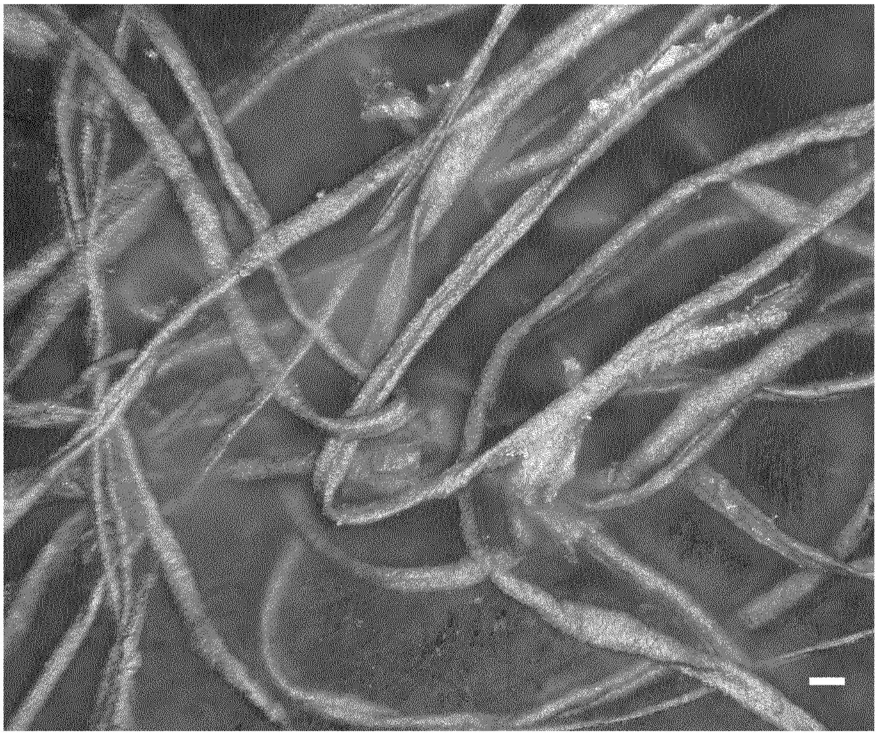
FIG. 10 An optical microscopy image of a metal-inside-fiber-composite, the cellulose based fiber being cotton fiber, scale bar 20 micrometers.

FIG. 10 shows a metal-inside-fiber-composite, the cellulose based fiber being cotton fiber.

FIGS. 1 to 10 show, that the metal-inside-fiber-composite 1 according to the invention increases the resilience of the composite, because the metal microstructure and metal particles 6 are protected inside the cellulose based fibers 2 and cannot be detached therefrom during further processing as a metal coating on the surface of a cellulose based fiber might be.

A disadvantage relating to a biopolymer based fiber having a metal coating on the surface is that the coating can be incomplete or the electrical conductivity can be inhibited by cracks in the coating. The metal-inside-fiber-composite 1 according to the invention does not suffer from this disadvantage.

In the following a method of producing a metal-and-fiber-composite according to the invention is outlined.

In an exemplary embodiment of the method the following chemicals are used:

Benzyl alcohol (in particular anhydrous, with a purity of 99.8%) as first alcohol, copper (II) acetylacetonate as metal salt (Cu(acac) 2, in particular with a purity of ≥99.99%), and glycerol as third alcohol (in particular with a purity of ≥99%), methanol as second alcohol (in particular anhydrous, with a purity of 99.9%) and acetone (in particular being extra dry ≥99.8%). All chemicals were used without further purification.

Instead of benzyl alcohol, alternatively, a derivative therefrom can be used. For example one of methyl benzyl alcohol, methoxy benzyl alcohol etc.

Instead of glycerol, alternatively, another polyol can be used, for example one of ethylene glycol, diethylene glycol, triethylene glycol etc.

Instead of methanol, alternatively, one of ethanol and propanol can be used.

Furthermore, delignified cellulose in the form of pulp was used as fibrous material.

The delignified cellulose can be obtained, for example, in the form of a 33 weight percent of cellulose in water mixture, wherein the water can be removed by drying the cellulose in an oven with ambient atmosphere at 60° c.

In this exemplary embodiment Cu(acac)2 is used as metal salt, nevertheless also copperacetate, coppermethoxide, nickelacetylacetonate, nickelacetate, and nickelmethoxide, or one of a gold metal salt, a silver metal salt, a palladium metal salt, a platinum metal salt and a lead metal salt, can be used as metal salt in combination with the chemicals listed above, and in the exemplary embodiment of the method outlined below.

In this exemplary embodiment delignified cellulose is used as fibrous material, nevertheless also, biopolymer based fibers, cellulose based fibers, and fibrous fabrics, in particular polymeric fibrous fabrics, can be used as fibrous material in combination with the chemicals listed above, and in the exemplary embodiment of the method outlined below.

For producing, according to an embodiment of the method for producing a metal-and-fiber-composite, metal-inside-fiber-composites according to the invention, 600 mg of Cu(acac)2 are dissolved in 5.2 mL of anhydrous benzyl alcohol (relating to a concentration of 0.44 moles Cu(acac)2 per liter), in particular inside a glove box under argon atmosphere. Alternatively, the concentration can be within the range of 0.2 to 0.5 moles per liter, in particular 0.22 moles per liter.

Five drops of methanol are added and the mixture is stirred, in particular for several hours. This reactant mixture/solution is transferred to a glass vessel containing 30 mg of loose cellulose fluff, in particular inside the glovebox.

The reaction vessel is sealed with a Teflon cap, in particular taken out of the glovebox, and transferred into a preheated oil bath set at 160° C. The solution is not stirred and kept at 160° C. for three hours. Nevertheless, stirring is optional, meaning that the solution, alternatively, can be stirred.

1.8 ml of glycerol (vol % of total amount of benzyl alcohol:vol % of glycerol=3:1) are dropped on top of the solution.

During the following hour still at 160° C., the liquid around the now reddish colored cellulose fibers becomes orange and transparent.

Subsequent to this color change, 2.6 ml of a previously prepared 0.44 moles Cu(acac)2 per liter anhydrous benzyl alcohol solution plus methanol are added (concentration can be within the range of 0.2 to 0.5 moles per liters, in particular 0.22 moles per liter Cu(acac)2). This addition of reactant solution is done twice more and in between the addition steps, the reaction was kept at 160° C. for one and a half hours until the liquid turned orange and transparent again.

Following the last color change, 2.7 mL of glycerol are dropped on top of the supernatant. The step is optional and can, alternatively, be omitted.

The reaction is kept at 160° C. for a total of less than 24 hours, in particular less than 12 hours or less than 8 hours. If adding glycerol is omitted (see above) the reaction can be kept at 160° C. for a total of less than 12 hours. Afterwards, the reaction mixture is cooled down to room temperature.

If stirring is applied (see above) and adding glycerol is omitted (see above), the reaction can be kept at 160° C. for a total of less than 6 h.

The metal-inside-fiber-composite, wherein the elemental metal is copper, is washed several times with acetone until the supernatant is transparent and colorless and they are dried under vacuum.

Using a glove-box is optional, because all steps of the method can be performed outside a glove-box under ambient atmospheric conditions.

Instead of the 160° C., also a temperature of 140° C. or of 180° C. can be used.

Heating can also be performed by using microwave irradiation.

The formation of the metal microstructure inside the cellulose based fiber proceeds via the transformation of the metal ionic species of the metal salt to the metal. It has been observed, that the addition of methanol to the first and/or second reactant mixture supports the reduction process such that it proceeds faster and to a more complete degree.

The first alcohol, in particular benzyl alcohol, acts as solvent and as reducing agent. It has been further observed that using glycerol in addition to the first alcohol and/or the second alcohol further supports the reduction process. It can be advantageous to add glycerol to the reactant mixture/solution after three hours of reaction time to give the metal salt enough time to penetrate into the biopolymer based fibers. It is assumed that the addition of glycerol at the beginning of the synthesis could accelerate the reaction mechanism too much and the metal could form as well in solution and not preferably inside the biopolymer based fiber.

It has been observed, that without repeating the step of adding the second reactant mixture to the first reactant mixture being combined with the fibrous material not enough amount of the metal microstructure forms inside the biopolymer based fiber to make the metal-inside-fiber-composite electrically conductive.

Without repeating the step of adding the second reactant mixture to the first reactant mixture being combined with the fibrous material the metal-inside-fiber-composite typically includes the metal microstructure by around 35 weight percent of the total weight of the metal-inside-fiber-composite. The amount of metal microstructure included inside the metal-inside-fiber-composite can, for example, be determined based on weighing the fibrous material before and after the production of the metal-inside-fiber-composite. It could also be determined based on weighing the metal-inside-fiber-composite and weighting the metal-inside-fiber-composite after selectively removing the fibrous material.

By repeating the step of adding the second reactant mixture to the first reactant mixture being combined with the fibrous material, metal-inside-fiber-composites can be produced including the metal microstructure at desired amounts. For example, the metal microstructure can be included by 60 weight percent, by at least 70 weight percent, by at least 80 weight percent, by at least 90 weight percent, or by at least 95 weight percent of the total weight of the metal-inside-fiber-composite.

Analysis of as-prepared metal-inside-fiber-composites and fibrous material by x-ray diffraction (not shown) reveal, that the metal microstructure includes crystalline metal particles.

Further advantages of the method for producing a metal-and-fiber-composite according to the invention are briefly outlined below:

- No need for expensive high-vacuum processes like magnetron sputtering,
- an easy synthesis using a comparably cheap heating source, in particular an oil bath, microwave irradiation,
- No need for a catalyst, only solvent and metal salt,
- No need for a pre- or post-treatment of the metal-and-fiber-composite for making it electrically conductive,
- Compared to other electroless liquid-phase approaches, method is fast (<24 h),
- The method provides for the growth of a large metal microstructure also inside fibrous materials, in particular inside void spaces of fibers, wherein the access to the inside is provided by pores which are drastically smaller that the particles of the formed metal micro-structure,
- The method can also be used for making biopolymer based, for example cellulose based, fibers or three-dimensional fibrous structures electrically conductive, not only 2D-like structures,
- The method is easily scalable, not needing to change the process parameters apart from using more chemicals and longer reaction times,
- It will be possible to mix or spin the metal-and-fiber-composite with other natural or synthetic fibers.

The invention claimed is:

1. A metal-inside-fiber-composite, comprising:

a biopolymer based fiber having a fiber wall and a void space, wherein the fiber wall envelops the void space such that the void space is formed as a continuous void space inside and along the fiber;

a metal microstructure, wherein the metal microstructure is a microstructure of an elemental metal, fills and extends through and along the continuous void space such that the fiber wall forms a protective layer around the metal microstructure, includes metal particles that are crystalline, has an average particle size of at least 80 nm, that are interconnected to form the metal microstructure, is included in the metal-inside-fiber-composite by at least 60 weight percent of a total weight of the metal-inside-fiber-composite, and is electrically conductive to make the metal-inside-fiber-composite electrically conductive.

2. The composite according to claim 1, wherein the biopolymer based fiber is a cellulose based fiber having the fiber wall and a fiber lumen, the fiber wall envelops the fiber lumen such that the fiber lumen forms the continuous void space inside and along the fiber.

3. The composite according to claim 1, wherein the elemental metal is one of copper, nickel, gold, silver, palladium, platinum and lead.

4. The composite according to claim 1, wherein the metal-inside-fiber-compo-site includes the metal microstructure having at least 70 weight percent of the total weight of the metal-inside-fiber-composite.

5. The composite according to claim 1, wherein the metal microstructure fills the void space to such a degree that the fiber wall lies against the metal microstructure, the fiber wall is supported by the metal micro-structure, and the fiber has a greater outer dimension compared to the fiber being in a state where the void space is empty.

6. The composite according to claim 1, wherein the metal particles have an average particle size between 80 nm and 1000 nm.

7. The composite according to claim 1, wherein the protective layer protects the metal microstructure from at least one of environmental corrosion or abrasion.

8. A fabric comprising the metal-inside-fiber-composite according to claim 1.

* * * * *